July 15, 1969   J. P. BURGARELLA   3,455,219
AUTOMATIC APERTURE SELECTION SYSTEM
Filed June 13, 1966   2 Sheets-Sheet 1
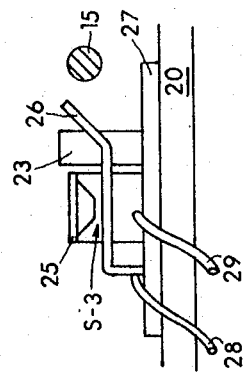
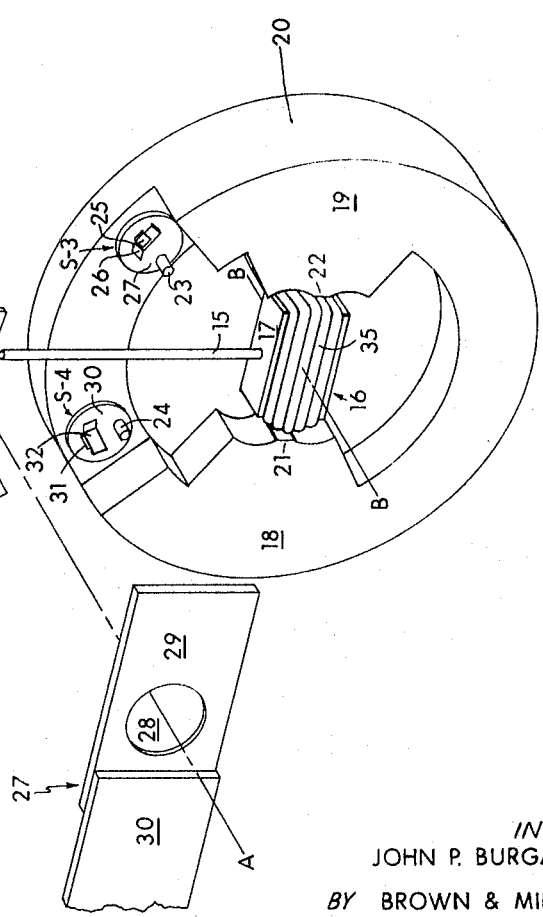
INVENTOR
JOHN P. BURGARELLA
BY BROWN & MIKULKA
AND
ROBERT F. O'CONNELL
ATTORNEYS

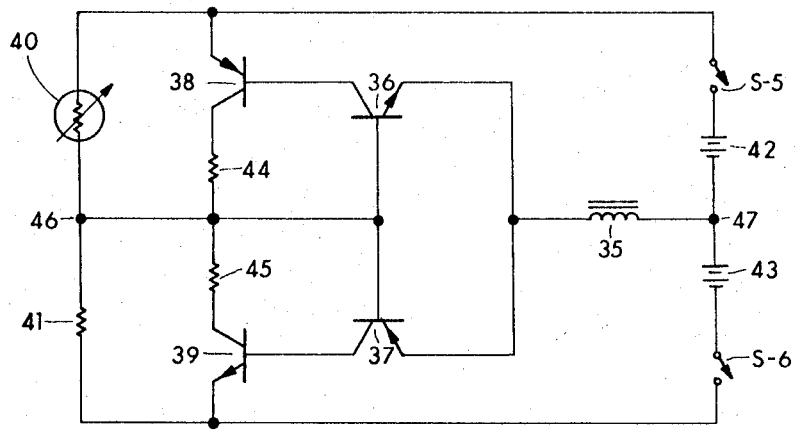
FIG. 4
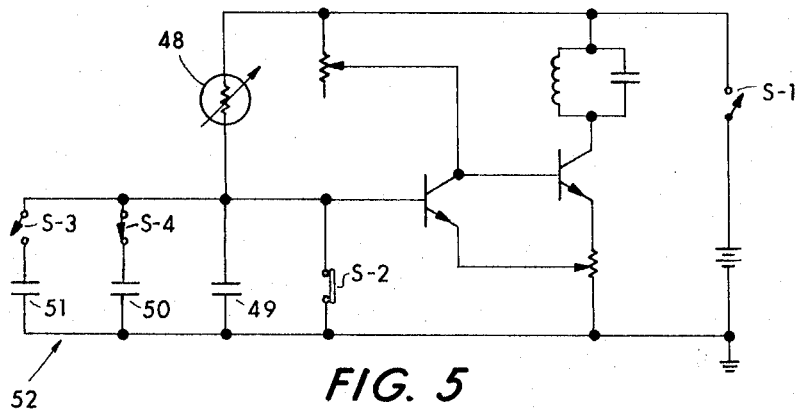
FIG. 5
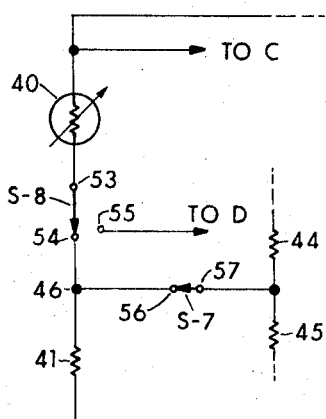
FIG. 6-A
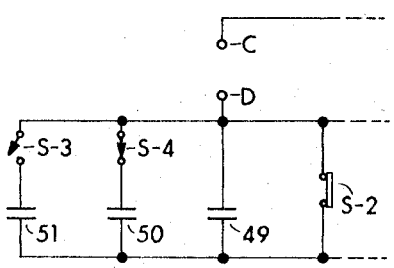
FIG. 6-B
INVENTOR
JOHN P. BURGARELLA
BY BROWN & MIKULKA
AND
ROBERT F. O'CONNELL
ATTORNEYS 3,455,219
AUTOMATIC APERTURE SELECTION SYSTEM
John P. Burgarella, Sudbury, Mass., assignor to Polaroid Corporation, Cambridge, Mass., a corporation of Delaware
Filed June 13, 1966, Ser. No. 557,229
Int. Cl. G01j *1/04;* G03b *9/04*
U.S. Cl. 95—10                                      7 Claims

ABSTRACT OF THE DISCLOSURE

An exposure control system for use in photographic apparatus which automatically selects an exposure aperture opening in response to the anticipated light level of a scene to be photographed. The aperture implement is manipulated before a lens opening with a movable electromagnetic coil. Switching means may be incorporated with the arrangement for adjusting the time constant of a shutter exposure interval timing circuit following an automatic selection of aperture.

---

This invention relates generally to exposure aperture systems for use in photographic apparatus, such as cameras, and more particularly to a system for automatically selecting an exposure aperture opening in response to the anticipated light level of a scene to be photographed.

In many previously known camera systems, the camera operator is obliged to select an appropriate exposure aperture opening in accordance with his best estimate of the amount of light available for a particular picture taking situation. In some cases he may be aided in his judgment by the use of a suitable meter for measuring the available light at the scene, the meter being calibrated in terms of conventional *f*-stop numbers to allow him to set the aperture opening manually in accordance with the meter reading.

In such manual aperture selection systems, the estimate of the light level by the operator may be incorrect and the subsequently selected aperture opening may result in a poorly exposed picture. Moreover, the necessity for a light meter to obtain a more accurate setting requires that the operator carry with him an extra piece of equipment which is subject to loss or damage.

In other cameras the aperture opening may be selected in a semiautomatic fashion. In such systems, for example, the camera operator manually preselects a particular shutter speed (i.e., exposure time) and the position of a mechanical stop mechanism in the aperture selection system is independently set, for example, by a photocell-galvanometer circuit. When the shutter is actuated the aperture diaphragm blades move until they reach the stop position. In such a semiautomatic aperture selection system the particular shutter speed which has been preselected may not be optimally coordinated with the aperture opening that is set and again a poorly exposed picture results.

In any event, in the above systems it becomes obvious that under many conditions the camera will not be used in an optimum fashion.

Other known partially automatic systems utilize mechanically or electrically controlled timing systems for controlling the exposure time over which the shutter system uncovers the lens to effect an exposure. In such systems, a single exposure aperture opening may be used over the entire range of exposure times being controlled, or else one of a plurality of aperture openings must be manually selected, again according to the best estimate of the light level by the operator. In such systems the manually selected aperture opening may require an extremely fast shutter speed which may be impossible to achieve with the shutter system at hand or else the aperture opening may require such a slow shutter speed that camera motion of a hand held camera occurs and a blurred picture results. Thus, even in such systems, it is clear that the exposure aperture-exposure time combination may not always be appropriate for the particular picture taking situation at hand.

This invention, however, provides an exceptionally simple method for automatically selecting an appropriate exposure aperture opening so that the operator no longer needs to guess at the light levels involved or no longer must make separate light measurements prior to taking a desired picture. The invention finds particular use with automatic exposure time control systems, for example, of the types described in U.S. Patent No. 3,205,795, issued to Grey on Sept. 14, 1965, and U.S. Patent No. 3,250,804, issued to Topaz on Sept. 14, 1965. Thus, when used in conjunction with such an exposure time control system, the operator need only focus the lens system in accordance with the distance from the scene to be photographed and then actuate the shutter system for exposure. An appropriate exposure aperture-exposure time combination is quickly and automatically determined when he depresses the shutter actuation button with no further effort required on his part.

In accordance with one particular embodiment of this invention, means are provided for automatically selecting one of three discrete exposure aperture openings in response to the anticipated light level of a scene to be photographed. Specifically, this may be accomplished in one instance by utilizing an aperture plate having a pair of openings of different sizes therein, said plate being movably mounted in a position adjacent the lens opening of the camera, the size of said lens opening being larger than that of either of the aperture plate openings. The plate is coupled by suitable mechanical means to a movable coil system positioned between the poles of apermanent magnet. The current through the coil is controlled by a bridge circuit utilizing a combination of a fixed resistor and a variable photocel resistor, the resistance of the photocell being responsive to the light level of a scene to be photographed. Such resistor combination is used with an appropriate triggering device which may utilize, for example, transistors to provide switching currents in opposite directions through the meter coil when the bridge circuit is in an unbalanced condition. In a balanced condition, the current through the coil is essentially equal to zero and the coil is maintained in a central or balanced position with respect to the magnet. The aperture plate is correspondingly maintained in a central position such that the larger of its two aperture openings is aligned with the lens opening and controls the amount of light therethrough. Such a condition is selected for expected light levels in a middle range of values.

If the anticipated light level is at a relatively higher or a relatively lower level, the resistance of the photocell changes appropriately in response thereto so as to unbalance the bridge in one or the other direction. When the unbalance is sufficient to actuate the trigger circuit the current through the meter coil is thereby increased to its maximum or saturated level in such one or the other direction to effect a rotation of the meter coil and, hence, a movement of the aperture plate. Movement of the plate in one direction as a result of a relatively higher light level causes the smaller of the two aperture plate openings to move into a position in alignment with the lens opening so that it then controls the amount of light therethrough. Movement of the plate in the other direction as a result of a relatively lower light level causes the plate to move completely away from its position adjacent the lens opening and in such a condition only the lens opening itself (the largest of the three openings involved) is used to control the amount of light passing therethrough.

Thus, any one of three aperture openings can be used to control the passage of light from the scene to be photographed through the lens system to a film medium. The details of such operation can be understood more clearly with reference to a particular embodiment described in the accompanying drawings in which:

FIG. 1 shows an exploded, perspective view of the structure of one particular embodiment of the exposure aperture selection system of the invention;

FIG. 2 shows a side elevational view of the structure of stop pin 23 and switch S-3 of FIG. 1;

FIG. 3 shows a side elevational view of the structure of stop pin 24 and switch S-4 of FIG. 1;

FIG. 4 shows a circuit diagram of the aperture selection control circuit which is used with the particular embodiment of the invention shown in FIG. 1;

FIG. 5 shows a circuit diagram of a particular exposure time control circuit which may be used with the invention;

FIGS. 6A and B show circuit diagrams of alternative embodiments of portions of the circuit of FIG. 4 and FIG. 5;

In FIG. 1 there is shown a portion 10 of a camera housing having a lens opening 11 therein. Mounted adjacent said lens opening is an aperture plate 12 having a pair of openings 13 and 14 located therein, opening 14 being of a larger size than opening 13 and being of a smaller size than lens opening 11.

Aperture plate 12 is fixedly mounted to a rod 15 which is in turn attached to a coil structure 16 that is pivotally mounted between the poles 18 and 19 of a permanent magnet 20 in an appropriately known fashion (not shown). Thus, coil structure 16 pivots about the axis B—B and includes a magnetic core 17 and a coil 35 wound thereon. Magnet 20 is fixedly mounted to the camera housing in any desired fashion and has a pair of protuberant, or salient, poles 21 and 22 as shown so that a minimum gap is provided between the ends of magnetic core 17 of coil structure 16 and the central portion of poles 18 and 19 when the coil is in its central or balanced position.

Because of the shape of the magnetic pole structure, coil structure 16 tends to be retained in its central position, as shown in the figure, when the current in coil 35 is zero. Thus, aperture plate 12 likewise is retained in its central position in which opening 14 is in alignment with lens opening 11 so as to provide an opening along axis A—A through which light from a scene to be photographed can be passed during exposure to a conventional film medium (not shown). The combination of opening 14 and lens opening 11 may be covered and uncovered by a suitable shutter system which can be actuated by the camera operator to effect an exposure.

The shutter system, for example, is shown in the drawing as a conventional dual blade "guillotine" system in which a first blade 29 having an opening 28 is moved into its open position, as shown, upon actuation of the shutter system by the operator so that opening 28 is aligned with openings 14 and 11 along axis A—A for an appropriate exposure. After a suitable time-controlled interval, blade 30 is moved from the position shown in FIG. 1 to a closed position in which it is in alignment with axis A—A so as to completely block opening 28, and, hence, prevent the passage of light through aperture opening 14 and lens opening 11. Shutter systems similar to this type are described in both the above-mentioned Grey and Topaz patents.

A pair of stop pins 23 and 24 are mounted on permanent magnet 20 so as to limit the travel of rod 15, and, hence, the travel of exposure plate 12. Mounted adjacent such stop pins are a pair of switches S-3 and S-4 the functions and structures of which are described in more detail with reference to FIGS. 2, 3, and 5.

As can be seen in the drawing, when aperture plate 12 is in its central position, as shown, middle-sized aperture opening 14 is positioned in alignment with both lens opening 11 and shutter opening 28 and the size of the exposure aperture opening is controlled by the size of opening 14.

When coil structure 16 is rotated in a clockwise direction, rod 15 moves to a point where it bears against stop pin 23 so as to bring aperture opening 13 into alignment with lens opening 11 and shutter opening 28 along axis A—A. Thus, the size of the exposure aperture opening is then controlled by the size of opening 13 so that the smallest opening is made available for the picture taking operation.

When coil structure 16 is rotated in a counterclockwise direction, rod 15 moves to a point where it bears against stop pin 24 so that aperture plate 12 is completely moved away from the path of lens opening 11 and the exposure aperture opening along axis A—A is determined solely by the size of lens opening 11 (shutter opening 28 being larger than such lens opening). Hence, of the three exposure aperture openings 13, 14, and 11, the largest is then made available for the picture taking situation.

As shown in FIG. 1 and FIG. 2, stop pin 23 is mounted to the structure of magnet 20 on a suitable insulated base 27. A first fixed contact element 25 of switch S-3 is also mounted to base 27 and has a wire lead 29 attached thereto. A second movable contact element 26 of switch S-3 is also suitably mounted to base 27 adjacent fixed contact element 25 and is normaly not in contact therewith. Contact element 26 has a wire lead 28 attached thereto and, thus, switch S-3 is arranged to be normally open. When rod 15 moves in a clockwise direction in FIG. 1 (to the left in FIG. 2) and reaches pin 23 it bears against movable contact element 26 and causes it to move into contact with fixed element 25 to close switch S-3.

A similar structure is shown in FIG. 1 and FIG. 3 wherein stop pin 24 is mounted to the structure of magnet 20 on an insulated base portion 30. A first movable contact element 32 of switch S-4 is mounted to base 30 and has a wire lead 34 attached thereto. A second fixed contact element 31 of switch S-4 is also suitably mounted to base 30 adjacent and normally in contact with movable contact element 32. Contact element 31 has a wire lead 33, attached thereto and, thus, switch S-4 is arranged to be normally closed. When rod 15 moves in a counterclockwise direction in FIG. 1 (to the right in FIG. 3) and reaches pin 24 it bears against movable contact element 32 and causes it to move away from its contact with fixed contact element 31 in order to open switch S-4.

Control of the movement of coil structure 16 is obtained by the use of the circuit shown schematically in FIG. 4. The operation of the circuit depends on the amount of light which impinges upon a photocell, which is shown schematically as the variable resistor 40, as explained as follows.

In the circuit a first pair of transistors 36 and 37 are connected with their emitter electrodes joined together at a common point which is thence connected through coil 35 of coil structure 16 to the junction point 47 of a pair of power sources, such as batteries 42 and 43. The base electrodes of transistors 36 and 37 are similarly connected together at a common point and thence to the junction point 46 of variable resistor 40, representing the photocell, and a fixed resistor 41. The opposite ends of resistors 40 and 41 are connected to batteries 42 and 43, respectively, through a pair of normally open, ganged switches S-5 and S-6.

The collector electrode of transistor 36 is connected to the base electrode of a third transistor 38, the emitter electrode of which is connected to one side of variable photocell resistor 40 and the collector electrode of which is connected to the base of transistor 36 through a fixed resistor 44. In a similar manner, the collector electrode of transistor 37 is connected to the base electrode of a fourth transistor 39 the emitter electrode of which is connected to one side of fixed resistor 41 and the collector electrode of which is connected to the base of transistor 37 through a fixed resistor 45.

The operation of the circuit of FIG. 4 may be initiated in any suitable manner upon the initiation of the exposure system of the camera. For example, the contacts of switches S–5 and S–6 may be suitably mounted within the camera housing so as to close when the camera shutter button is actuated. The physical structure of such an actuation system may be set up in any convenient manner as is well known to those skilled in the art and, hence, is not shown and described specifically herein. When switches S–5 and S–6 are closed, suitable bias voltages are applied to the transistors of the circuit so that, depending on the relationship between the resistance values of variable resistor 40 and fixed resistor 41, either transistor 36 or transistor 37 is conductive (but not both simultaneously) or both transistors 36 and 37 are simultaneously nonconductive. For example, when the resistance of resistor 40 has a value relative to the resistance value of resistor 41 which is within a specified range, the circuit is such that both transistors 36 and 37 are nonconductive and no current flows through coil 35. Under such conditions, coil structure 16 remains in its central or balanced condition and aperture opening 14 is in line with shutter opening 28 and lens opening 11 along axis A—A of FIG. 1. Such nonconductive states exist so long as the resistance of photocell 40 is within such preselected range corresponding to a middle range of light level at the scene to be photographed.

When the light level is relatively high, the resistance value of photocell resistor 40 decreases to a value below such specified range and becomes appreciably less than the resistance of fixed resistor 41. Under such conditions, the voltage at point 46 is sufficiently positive with respect to the voltage at point 47 so that transistor 36 becomes conductive (transistor 37 remaining nonconductive) and a current flows from left to right, in accordance with the configuration shown in the drawing, through coil 35 of coil structure 16. Such a flow of current causes coil structure 16 to rotate in a clockwise direction so as to move aperture plate 12 to the right in FIG. 1 until it hits stop pin 23. In such a position, for high light level conditions, aperture opening 13 will be moved into alignment with lens opening 11 and shutter opening 28 along axis A—A.

Under conditions of low light levels at the scene to be photographed, the resistance of photocell resistor 40 increases to a value above such specified range and becomes appreciably greater than the resistance of fixed resistor 41. Under such conditions, the voltage at point 46 is sufficiently negative with respect to the voltage at point 47 so that transistor 37 becomes conductive (transistor 36 remaining nonconductive) and causes a current to flow from right to left, in accordance with the configuration shown in the drawing, through coil 35 of coil structure 16. Under such conditions coil structure 16 rotates in a counterclockwise direction so that aperture plate 12 is completely removed from the axis A—A of FIG. 1 and moves to a position adjacent stop pin 24. Thus, in such position, for relatively low light level conditions, the amount of light utilized during exposure is controlled by the size of lens opening 11.

In either case, when the light level conditions cause a sufficient unbalance between the values of resistors 40 and 41, it is desirable that transistors 36 or 37, depending on the direction of the unbalance, make the transition from a nonconductive to a conductive state in a relatively short time so that there is a sharp and well-defined transition to such conductive state. In addition, once the conductive state is reached for the particular transistor involved, it is desirable that such transistor remain conductive even if the comparative resistance values of resistors 40 and 41 change. For example, if the value of resistor 40 is such as to cause conduction of transistor 36 under high light level conditions, it is desirable that transistor 36 not be cut off if, during the exposure interval, the light level drops enough to cause the voltage at point 46 to fall below a level normally sufficient to cause conduction. If the latter situation were to occur, an undesirable "hunting" of the system would result and the aperture plate may be caused to oscillate back and forth between two positions if the light level tends to vary about the point at which conduction occurs. To avoid such a possible oscillatory, or hunting, condition and to sharpen the transition from a nonconductive to a conductive state, transistors 38 and 39 are utilized in the control circuit of FIG. 4.

As can be seen from the figure, when transistor 36, for example, becomes conductive it causes a conduction of transistor 38 so that current flowing through the collector resistor 44 of transistor 38 adds to the current already flowing through transistor 36, thereby sharply increasing the current through the latter transistor and, hence, through coil 35. The increased current in transistor 36 in turn further increases the current in transistor 38 so that the circuit combination of transistors 36 and 38 operates as a regenerative, or positive feedback, system. In such a system, the current through transistor 36 and coil 35 increases sharply and a rapid transition from a nonconductive to a conductive state occurs. A similar operation results when resistances 40 and 41 become balanced in the opposite direction because of the regenerative action of the combination of transistors 37 and 39.

Under high light level conditions, once transistor 36 becomes conductive, it tends to remain in a conductive state independently of a change in the resistance of variable photocell resistor 40 because of the presence of transistor 38 which essentially "takes over" control of such conduction. Thus, even if the light level decreases and the resistance of resistor 40 thereby increases so that the voltage at point 46 drops below the point at which conduction of transistor 36 would normally have been initiated, transistor 36 remains conductive because of the conduction of transistor 38. In a similar manner, because of the presence of transistor 39, transistor 37 tends to remain conductive under low light level conditions even if the light level increases.

The presence of transistors 38 and 39 thereby enhances the triggering operation of the circuit of FIGURE 4 and prevents any hunting of the aperture selection system even if the light level of the scene to be photographed varies during the exposure interval.

Thus, the switching action of the circuit of FIG. 4 provides three discrete aperture opening positions, depending upon the anticipated light level at the scene to be photographed just prior to actual exposure. The light level at which switching occurs (i.e., either transistor 36 or 37 becomes conductive) is sharply defined and can be adjusted by an appropriate selection of the resistors utilized to set up the bias voltage conditions on the transistors of the circuit.

As described above, the aperture selection control system of this invention may be utilized with an appropriate exposure time control system such as that shown in the patent issued to Topaz (U.S. Patent No. 3,205,804) mentioned above. In that patent, the exposure time is determined by the time constant of the circuit shown in FIG. 1 thereof. Such time constant is in turn determined by the resistance of a photocell and a capacitor which form the conventional "RC" time constant of the circuit. Since the operation of that circuit is described fully in the aforementioned Topaz patent, it will not be described in detail here. It is clear, however, that when the exposure aperture opening is selected in accordance with this invention, so that the amount of light utilized during exposure is controlled by one of three separate and distinct aperture opening sizes, the exposure time must be controlled both in accordance with the particular aperture opening which has been so selected and in accordance with the light level which actually exists during the exposure interval. Control of the exposure time in accordance with the particular aperture opening selected by this invention can be appropriately obtained by changing the time constant of the time control circuit involved. Such change can be most easily accomplished by changing the value of the capacitance therein as discussed below.

For purposes of clarity, the time control circuit of the Topaz patent is substantially reproduced here in FIG. 5. In that figure the time constant is determined by the value of the resistance of a photocell 48 and the value of the capacitance determined by the capacitance bank 52 comprising an appropriate combination of capacitances 49, 50, and 51. The overall capacitance value depends on the operation of switches S–3 and S–4 which are schematic representations of the switches shown in association with stop pins 23 and 24 of FIGS. 1–3, respectively. In the case where the ambient light level of a scene to be photographed is within its middle range and the value of photocell resistance 40 is in a preselected range relative to the resistance of fixed resistor 41 of FIG. 4, aperture blade 12 of FIG. 1 is in its central position so that the light level during exposure is controlled by aperture opening 14. Under such conditions, the time constant of the time control circuit shown in FIG. 5 is controlled by the values of capacitances 49 and 50 both of which are present in the circuit of FIG. 5. In that situation, switch S–4 is in its normally closed position and switch S–3 is in its normally open position.

Under conditions of high ambient light level in which the resistance of photocell 40 is appreciably less than that of fixed resistor 41 in FIG. 4, aperture plate 12 rotates clockwise so that the light level during exposure is controlled by the smallest aperture opening 13 thereof. Under such conditions switch S–3 closes (switch S–4 remaining in its closed position) and the time constant of the time control circuit shown in FIG. 5 is determined by the value of capacitances 49, 50, and 51 which are present in the circuit under such conditions.

Under conditions of low ambient light levels wherein the resistance of photocell 40 is appreciably greater than the resistance of fixed resistor 41 of FIG. 4, aperture plate 12 rotates in a counterclockwise direction and is completely removed from alignment with axis A—A. Under such conditions the light level during exposure is determined by the largest of the three selectable openings (lens opening 11). In such a position, switch S–4 then opens (switch S–3, of course, remaining in its normally open position) and the time constant of the time control circuit of FIG. 5 is determined solely by the value of capacitance 49 which is the only capacitance present in the circuit under such conditions.

The operation of the aperture selection system of FIGS. 1 through 4 in combination with the time control circuit of FIG. 5 can be described generally as follows. Switch S–1 of FIG. 5 is arranged to close upon actuation of the shutter button by the camera operator in any convenient manner as discussed in the Topaz patent, for example. Simultaneously with the closure of switch S–1, switches S–5 and S–6 of FIG. 4 are also closed. Thus, the aperture selection control circuit of FIG. 4 is energized at the same time as energization of the time control circuit of FIG. 5 occurs. The control circuit of FIG. 4 thereupon immediately selects an appropriate exposure aperture and after a suitable time delay, as discussed in the Topaz patent, switch S–2 of FIG. 5 opens and the integrating circuit of FIG. 5 is caused to operate to cause the shutter system to close after an appropriate time interval determined by the RC time constant of the circuit, which in turn is determined by the light level at the scene to be photographed during exposure as measured by photocell 48.

Thus, the exposure aperture opening selection system provided by this invention allows for the selection of an optimum combination of exposure aperture and exposure time which selection is made automatically and is dependent upon the value of the light level at the scene to be photographed. It is clear that the exposure aperture opening selection system of the invention may be used with any appropriate time control system and that the time control system of the Topaz patent (as substantially reproduced in FIG. 5) represents only one particular embodiment that may be useful with the aperture opening selection system of the invention.

In an alternative embodiment of the invention, it is possible to utilize a single photocell resistor element for operation in both the aperture selection control circuit of FIG. 4 and in the exposure time control circuit of FIG. 5 since such circuits operate sequentially in time. Thus, an appropriate aperture is selected initially by the operation of the circuit of FIG. 4 and subsequently the time control circuit of FIG. 5 operates to select an appropriate exposure time to be used in conjunction therewith.

Such an embodiment is shown schematically in FIGS. 6(A and B) wherein FIG. 6A reproduces the left-hand portion of the circuit of FIG. 4, including photocell resistor 40, fixed resistor 41, junction point 46 and resistors 44 and 45, while FIG. 6B reproduces the left-hand portion of the circuit of FIG. 5, including capacitor bank 52 and switch S–2. Photocell resistor 48 has been omitted in FIG. 6B and terminals C and D indicate the terminals to which such photocell would normally have been connected as described above with respect to FIG. 5. Photocell resistor element 40 in FIG. 6A has one terminal directly connected to terminal C of FIG. 6B while its other terminal is connected to a movable contact element 53 of a single-pole, double-throw switch S–8. A first fixed contact element 54 of switch S–8 is connected to one end of fixed resistor 41 at junction point 46 and a second fixed contact element 55 is connected to terminal D of FIG. 6B. A single-pole, single-throw switch S–7 has its fixed contact element 56 connected to junction point 46 and its movable contact element 57 connected to the junction of resistors 44 ad 45.

When switches S–7 and S–8 are in their first positions, as shown in FIG. 6A, switch S–8 has contact element 53 connected to contact element 54 and switch S–7 has contact element 57 connected to contact element 56 so that it is normally closed. In such positions, photocell 40 and resistor 41 are both inserted into the circuit of FIG. 4 and no photocell is present in the circuit of FIG. 5. When switches S–7 and S–8 are in their second positions, switch S–8 has contact element 53 connected to contact element 55 and switch S–7 has contact element 57 out of contact with contact element 56 so that switch S–7 is now open. In such positions, photocell resistor 40 and fixed resistor 41 are both removed from the circuit of FIG. 4 and photocell resistor 40 is inserted into the circuit of FIG. 5 between terminals C and D.

Switches S–7 and S–8 are caused to move from such first positions to such second positions in a sequential manner just prior to the opening of switch S–2 in FIG. 6B. Thus, once an appropriate aperture has been selected by the operation of the circuit of FIG. 4, switch S–7 first opens, switch S–8 then subsequently operates to connect photocell 40 into the circuit of FIG. 5, and switch S–2 then subsequently opens to perform the integrating action of the latter circuit. Switches S–7 and S–8 can be physically mounted within the camera housing in any appropriate manner (not shown) so as to be actuated from their first positions to their second positions at appropriate points in time prior to the actuation of switch S–2.

As explained above, with reference to the operation of the circuit of FIG. 4, once that circuit has been energized under relatively high or relatively low light level conditions to cause a conduction of either transistor 36 or transistor 37, the removal of photocell 40 and resistor 41 does not affect the operation of such transistors.

Moreover, in a balanced state wherein neither transistor is conductive, the removal of photocell 40 and resistor 41 does not effect the balance and each conductor remains nonconductive under medium light level conditions.

Thus, a single photocell element may be used to operate the circuits of both FIGS. 4 and 5 since such circuits operate in sequential time intervals.

Although the above description and drawings depict specific preferred embodiments of the invention, those skilled in the art will be able to recognize other embodiments that may differ in some elements from the particular structures discussed here. Thus, variations in many of the specific structural elements used will occur to those skilled in the art without departing from the scope of this invention. Hence, the invention is not to be construed as limited to the embodiment specifically shown and described herein, except as defined by the appended claims,

What is claimed is:

1. In a photographic apparatus having an exposure aperture of maximum dimension for permitting the passage of light from a scene to be photographed therethrough,
    means for automatically selecting the size of an exposure aperture opening for use with said maximum fixed aperture during an exposure interval comprising:
    a movable aperture plate having a pair of discrete openings located therein;
    an electromagnetic means including a movable coil wound on a magnetic core pivotally mounted between the poles of a permanent magnet and coupled to said movable aperture plate;
    circuit means including a variable photocell resistance element and a trigger circuit for supplying current to said electromagnetic coil, the value and direction of said current being responsive to the value of said photocell resistance, for controlling the position of said coil; and
    means for actuating said circuit means in response to the anticipated light level of the scene to be photographed whereby said aperture plate is automatically positioned relative to said maximum fixed aperture to provide a selected exposure aperture opening during said exposure interval.

2. The invention according to claim 1 including:
    a time control circuit responsive to the light level of said scene during exposure for controlling the time period of said exposure interval; and
    means for automatically adjusting the time constant of said time control circuit in response to the automatic selection of said exposure aperture opening.

3. The invention according to claim 2 in which said time control circuit includes a plurality of capacitances; and
    said adjusting means includes means for selecting a specified combination of said capacitances to adjust the time contant of said time control circuit in response to the automatic selection of an exposure aperture opening.

4. In a photographic apparatus having an exposure aperture of maximum fixed dimension for permitting the passage of light from a scene to be photographed therethrough,
    means for automatically selecting the size of an exposure aperture opening for use with said maximum fixed aperture during an exposure interval comprising:
    a movable aperture plate having a pair of discrete openings located therein;
    a movable coil structure coupled to said plate and pivotally mounted between the poles of a permanent magnet;
    circuit means for controlling the movement of said movable coil in response to the light level of a scene to be photographed;
    said circuit means comprising a bridge circuit including at least a pair of transistors, a fixed resistor and a photocell resistor, the resistance of which varies in response to said light level, said transistors being in a conductive or a nonconductive state depending on the relative resistance values of said variable resistor and said fixed resistor, said coil being caused to assume a specified position in respone to the value and direction of current therethrough supplied by said bridge circuit whereby said aperture plate is automatically positioned relative to said maximum fixed aperture to provide a selected aperture opening during said exposure interval.

5. In a photographic apparatus having an exposure aperture of maximum fixed dimension for permitting the passage of light from a scene to be photographed therethrough,
    means for automatically selecting the size of an exposure aperture opening for use with said maximum fixed aperture during an exposure interval comprising:
    a movable aperture plate having a pair of discrete openings located therein;
    a movable coil structure coupled to said plate and pivotally mounted between the poles of a permanent magnet;
    circuit means for controlling the movement of said movable coil in response to the light level of a scene to be photographed, said circuit means comprising:
    a first pair of transistors forming a first regenerative circuit for supplying current to said coil in a first specified direction when said first regenerative circuit is conductive;
    a second pair of transistors forming a second regenerative circuit for supplying current to said coil in the opposite direction when said second regenerative circuit is conductive;
    said first and second regenerative circuits being capable of operating either in a first state wherein neither circuit is conductive, a second state wherein one of said circuits is conductive or a third state wherein the other of said circuits is conductive;
    a first variable resistor;
    a second fixed resistor;
    the resistance values of said variable and said fixed resistors bearing a relationship during operation of said control circuit whereby said regenerative circuits are caused to operate in one of said three states in response to said relationship.

6. In a photographic apparatus having an exposure aperture of maximum fixed dimension for permitting the passage of light from a scene to be photographed therethrough,
    a movable aperture plate having a plurality of discrete openings located therein;
    aperture control means including a photocell means responsive to the anticipated light level of said scene for automatically positioning said movable aperture plate relative to said maximum fixed aperture to provide a selected exposure aperture opening during an exposure interval;
    time control means for automatically controlling the duration of said exposure interval in response to the light level of said scene during exposure; and
    means for automatically switching said photocell means from said aperture control means to said time control means whereby said photocell means is made available for measuring said light level during said exposure interval.

7. In a photographic apparatus having an exposure aperture of maximum fixed dimension for permitting the passage of light from a scene to be photographed therethrough, means for automatically selecting the size of an exposure aperture opening for use with said maximum fixed aperture during an exposure interval comprising:
a movable aperture plate having a plurality of discrete openings located therein;
aperture control circuit means including therein a photocell means, the resistance of which is responsive to the anticipated light level of said scene and a fixed resistor, said aperture control circuit means providing an output current in response to the relative values of said photocell resistance and said fixed resistor;
electromagnetic means rotatable in response to said output current of said aperture control circuit means;
means for coupling said electromagnetic means to said rotatable aperture means whereby said aperture means is automatically positioned relative to said maximum fixed aperture to provide a selected exposure aperture opening during said exposure interval;
time control circuit means for controlling the duration of said exposure interval in response to the light level of said scene during exposure; and
means for automatically switching said photocell means from said aperture control circuit means into said time control circuit means and for simultaneously removing said fixed resistor from said aperture control circuit means whereby said photocell means is made available for measuring the light level of said scene during exposure.

References Cited

UNITED STATES PATENTS

| | | | |
|---|---|---|---|
| 2,956,491 | 10/1960 | Fischer et al. | 95—64 |
| 2,978,970 | 4/1961 | Fahlenberg | 95—10 |
| 3,257,919 | 6/1966 | Sato et al. | 95—10 |

NORTON ANSHER, Primary Examiner

JOSEPH F. PETERS, Jr., Assistant Examiner

U.S. Cl. X.R.

95—64